March 5, 1968 D. E. STEIN 3,371,732
PNEUMATIC WEIGHT TRANSMITTER
Filed June 30, 1966
FIG. 1
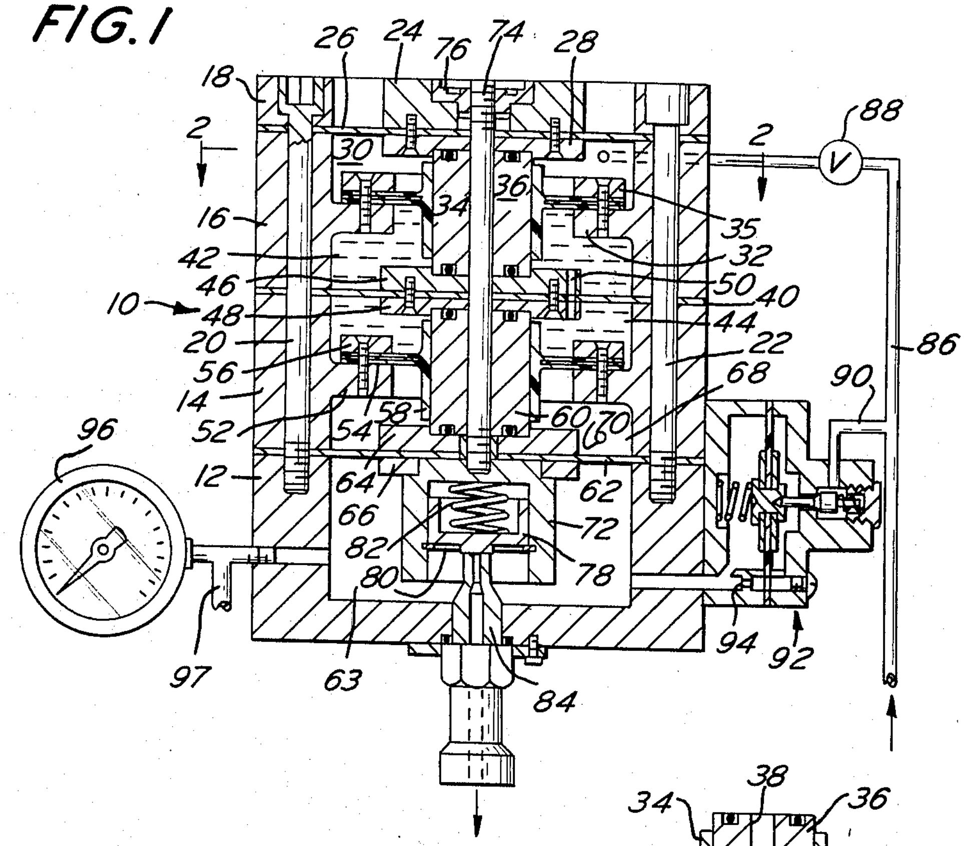
FIG. 2
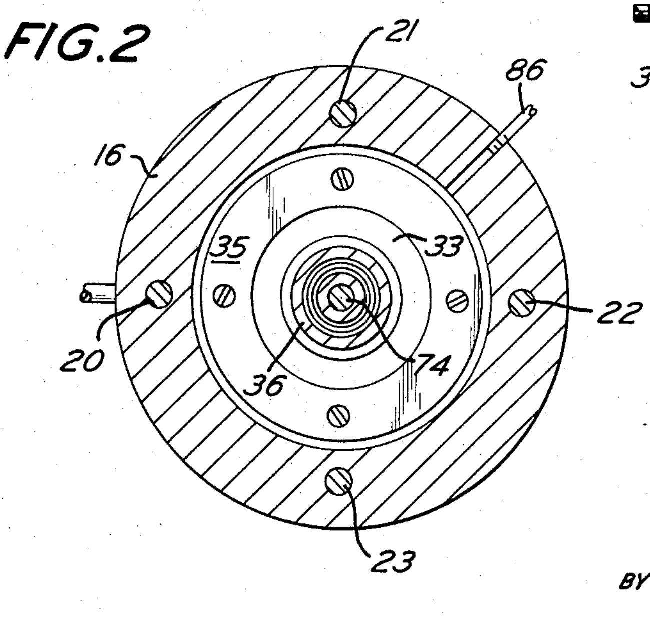
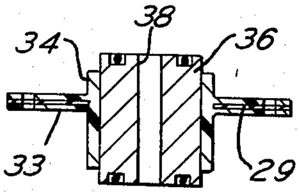
FIG. 3
INVENTOR
DONALD E. STEIN
BY Seidel & Gonda
ATTORNEYS.

United States Patent Office 3,371,732

Patented Mar. 5, 1968

3,371,732

PNEUMATIC WEIGHT TRANSMITTER

Donald E. Stein, Millville, N.J., assignor to Kane Air Scale Company, Glassboro, N.J., a corporation of New Jersey Filed June 30, 1966, Ser. No. 561,872
8 Claims. (Cl. 177—208)

This invention relates to a pneumatic weight transmitter which is in the form of a measuring instrument. The instrument output signal is a pneumatic pressure that is linear and directly proportional to the weight or force applied. The instrument output is suitable for indicating, controlling, or recording weight or force.

The transmitter is designed on the force balance principle, that is, the weight being measured is null balanced in the net load chamber by air pressure acting on the effective area of a diaphragm supported plate. The use of air as the transmitting and balancing medium eliminates all knife edges, levers, and pivots.

A tare balance chamber with a tare load diaphragm supported plate is provided to pneumatically counterbalance any portion of the total weight such as the weight of the container so that the net weight can be ascertained. This feaure eliminates the need for an external mechanical counterbalance system to offset the tare load. The tare balance chamber is a separate chamber with its balance plate directly connected to the center shaft so that regulated pressure in this chamber adds to the pressure in the net load chamber, thus carrying a fixed part of the weight or force applied to the transmitter without affecting the net weight measurement. All moving parts are totally enclosed and protected from weather, corrosive atmosphere, dirt, dust, etc. Friction in the transmitter is substantially eliminated by the lack of any rubbing or rolling parts. The total movement of the diaphragm system from zero load to full load does not exceed .010 inch. A built-in mechanical stop is provided to carry large weight changes until the air pressure builds up to counterbalance the weight (the center shaft moves down .125 inch to engage the mechanical stop).

Pressure under the net load diaphragm is regulated automatically by a differential regulator to oppose exactly the weight or force placed on the unit. An increase of the weight on the platform forces the bleed nozzle to close which results in an increase in the air pressure in the net load chamber and a decrease in weight on the platform causes the bleed nozzle to open allowing a larger bleed rate which results in a decrease in air pressure in the net load chamber. Dampening chambers are provided to eliminate pulsation and to permit uniform measurements without clatter or excessive vibration even if the load includes mixers or other devices which would cause critical vibration.

The transmitter is provided with novel bonded diaphragm structures on opposite sides of the dampening chambers along with the use of thin nylon reinforced diaphragms which substantially reduce any sliding forces and greatly improve the sensitivity of the transmitter so that the transmitter output is linear over the complete weighing range and will reproduce measurements with an error not in excess of 0.1 of one percent of full scale. At the same time, the transmitter is of increased sensitivity so as to permit measurements of one part in five thousand of full scale.

It is an object of the present invention to provide a novel pneumatic weight transmitter.

It is another object of the present invention to provide a pneumatic weight transmitter having an accuracy with an error not in excess of 0.1 of one percent of full scale.

It is another object of the present invention to provide a pneumatic weight transmitter which is simple, reliable, and adapted to be utilized with a complete line of control accessories.

For the purpose of illustrating the invention, there is shown in the drawings a form which is presently preferred; it being understood, however, that this invention is not limited to the precise arrangements and instrumentalities shown.

FIGURE 1 is a vertical sectional view of the transmitter of the present invention.

FIGURE 2 is a sectional view taken along the line 2—2 in FIGURE 1.

FIGURE 3 is a sectional view of one of the dampening diaphragms.

Referring to the drawing wherein like numerals indicate like elements, there is shown in FIGURE 1 the vertical cross section of the pneumatic weight transmitter designated generally as 10.

The transmitter 10 includes a housing comprised of body sections 12, 14, 16 and 18 held together by a plurality of bolts 20, 21, 22 and 23. Section 12 is generally cup-shaped. Sections 14 and 16 are identical and generally cylindrically shaped. Section 18 is annular.

A weighing anvil 24 is provided on the upper surface of a tare load diaphragm 26. Diaphragm 26 has its periphery clamped between sections 16 and 18. A disk 28 is provided on the undersurface of diaphragm 26. Flat-headed countersunk screws or the like interconnect the disk 28 to the anvil 24 and diaphragm 26.

A tare weight chamber 30 is provided below the diaphragm 26. Body section 16 has an inwardly directed annular flange 32 extending radially inwardly for a distance corresponding to approximately twenty percent of the inner diameter of section 16 and positioned substantially equidistant from the ends of section 16. A diaphragm 33 has outer peripheral portions clamped to the upper surface of flange 32 by means of a ring 35 and flat-headed counter-sunk screws. The diaphragm 33 is annular and is integral at its inner peripheral surface with a cylindrical portion 34. The cylindrical portion 34 is bonded to the outer periphery of a guide cylinder 36. Guide cylinder 36 has an axial bore 38. The ends of cylinder 36 are provided with annular grooves which receive O-ring seals, one of which provides a seal between the upper end of cylinder 36 and a recess on the lower surface of disk 28.

The diaphragm 33 and its integral cylindrical portion 34 are preferably made from a flexible resilient polymeric material such as Hycar reinforced with a mesh material 29 such as nylon. Hycar is a commercially available polymer of an acrylic acid ester of the B. F. Goodrich Company. Other materials may be substituted if desired so long as they have the same characteristics of a rupture strength in excess of 60 p.s.i. with a thickness of .025 inch and a durometer hardness below 35. In a preferred embodiment the durometer hardness is 30 and the rupture strength exceeds 80 p.s.i., such as 90 p.s.i. The diaphragm 33 and its cylindrical portion 34 are preferably made by casting the same in a mold while using the cylinder 36 as a core piece so that its outer periphery will be bonded to the inner periphery of the portion 34. Cylinder 36 is preferably made from a lightweight non-corrosive material such as aluminum.

A dampening diaphragm 40 has its outer periphery portion clamped between juxtaposed surfaces on the body sections 14 and 16. The space between diaphragms 33 and 40 constitutes a dampening chamber 42. A second dampening chamber 44 is provided below diaphragm 40. Diaphragm 40 is provided with an upper disk 46 and a lower disk 48 interconnected by flat-headed countersunk screws. Hereinafter, the disks 46 and 48 may be referred to as plate members. Chambers 42 and 44 are interconnected by a restricted bleed passage 50 in the disks 46 and 48 with a corresponding aligned bleed passage being provided in the diaphragm 40. Chambers 42 and 44 are filled with a lightweight oil base medium such as brake fluid and is preferably temperature stable.

The upper surface of disk 46 is recessed and receives the lower end of cylinder 36. The O-ring seal on the lower face of cylinder 36 is in sealing contact with the recess on disk 46. A flange 52, similar to flange 32, is provided on the inner peripheral surface of section 14 in the same relative location. A diaphragm 54 has its outer peripheral portion clamped to the upper surface of flange 52 by means of a ring 56 and flat-headed countersunk screws. Diaphragm 54 is identical with diaphragm 33 and provided with a cylindrical portion 58 corresponding to portion 34. The inner peripheral surface of portion 34 is bonded to the outer peripheral surface of cylinder 60. Cylinder 60 is identical with cylinder 36.

An O-ring seal is provided on the upper surface of cylinder 60 in sealing contact with a recess on the lower surface of disk 48.

A net load diaphragm 62 has its outer peripheral portion clamped between juxtaposed surfaces on the body sections 12 and 14. The space between diaphragms 54 and 62 is designated as chamber 68 which is vented to atmosphere by way of vent 70. A disk 64 is provided on the upper surface of diaphragm 62. Disk 64 is connected by flat-headed countersunk screws to a ring 66 on the lower surface of diaphragm 62. The upper surface of disk 64 is recessed and receives the lower end of cylinder 60. An O-ring seal on the lower end of cylinder 60 is in sealing contact with the recess on disk 64.

A valve cage 72 has a boss force-fitted, threaded or otherwise coupled to the inner periphery of ring 66 in overlying relation. A weight transmitting rod 74 has its lower end threaded to the boss on cage 72. The upper end of rod 74 is threadedly coupled to a nut 76 rotatably received within a recess on the upper surface of anvil 24. Rod 74 extends through an axial hole or bore in diaphragm 62, disk 64, cylinder 60, disk 48, diaphragm 40, disk 46, cylinder 36, disk 28, diaphragm 26 and anvil 24.

A cup-shaped valve member 78 is slidably received within the cage 72. Cage 72 is an inverted cup-shaped member. A spring 82 biases the valve member 78 downwardly until it engages a limit stop conveniently formed by means of a retaining ring 80. A nozzle 84 is supported by the bottom wall of the body section 12 with one end juxtaposed to a head on the valve member 78.

A conduit 86, provided with a regulator 88 which may be remotely operated, communicates with the tare weight chamber 30 to facilitate the introduction of pressurized air into chamber 30. A conduit 90 extends from conduit 86 to a differential pressure regulator 92 which communicates with the net load chamber 63. Regulator 92 is of the type responsive to the differential pressure in conduit 90 and chamber 63 with a fixed orifice 94 therebetween. Conduit 86 is to be connected to a source of pressurized air. Chamber 63 is in communication with a conventional pressure gauge 96 supported by body section 12.

The operation of the pneumatic weight transmitter 10 is as follows:

When a weight is placed on anvil 24, the force is transmitted through rod 74 to the cage 72, and through the spring 82 to the valve member 78. The result is the closing of the nozzle 84 by means of the valve head on the valve member 78. Pressure regulator 88 may be opened to permit the introduction of pressurized air into chamber 30 to offset the weight of any container or the like so that only the net load is ascertained. Pressurized air at a constant flow is introduced through conduit 90 and regulator 92 into the net load chamber 63.

As the pressure builds up in chamber 63, it will reach a balancing pressure wherein it matches the weight applied to the anvil 24. At this point, the pressure in chamber 63 will remain constant with any excess air introduced thereinto escaping out of the nozzle 84. Nozzle 84 communicates with atmosphere. Conduit 97 may be connected to a controller, recorder, or the like. The pressure in chamber 63, and hence the unknown weight, can be read on gauge 96 calibrated in weight such as pounds. The transmitter output is linear over the complete weighing range and will reproduce the unknown weights with an error not in excess of 0.1 of one percent of full scale. It is believed that the increased accuracy of the transmitter 10 results from these relationships as well as the structural details of the novel dampening diaphragms and the fact that chamber 68 is vented.

The body sections are preferably non-corrosive and made from cadmium plated steel. The anvil and the various disks and rings described above are preferably made from a lightweight noncorrosive material such as the aluminum alloys. The dampening chambers are of the same diameter as the net load chamber and tare weight chamber. However, it will be noted that the diaphragms 33 and 54 are provided with an exposed surface area which is substantially smaller than the exposed surface area on the diaphragms 26, 40 and 62.

It will be apparent to those skilled in the art that the air in chamber 63 acts on diaphragm 62, ring 66, cage 72 and the lower exposed face of the valve member 78. In view of the sealed direct abutting contact between elements 20, 28, 36, 46, 48, 60, 66, and 72, there is substantially no relative movement between these elements and rod 74. As pointed out above, the total movement of the diaphragm system between zero load and full load is less than .01 inch. If an excess load is applied, the lower end of cage 72 bottoms out by contacting the section 12 to prevent damage to the diaphragm system.

The present invention may be embodied in other specific forms without departing from the spirit or essential attributes thereof and, accordingly, reference should be made to the appended claims, rather than to the foregoing specification as indicating the scope of the invention.

I claim:

1. A pneumatic weight transmitter comprising a body having a weighing anvil connected to a tare weight diaphragm, said diaphragm partially defining a portion of a tare weight chamber, said body having a net load chamber partially defined by a net load diaphragm, at least two dampening chambers between said tare weight and net load chambers, said dampening chambers each being partially defined by an annular dampening diaphragm, a dampening medium in said dampening chambers, the outer peripheral portion of each dampening diaphragm being supported by a separate flange on the inner peripheral of said body, the inner peripheral of each dampening diaphragm being connected to a guide member, means defining an outlet flow passage from said net load chamber, a valve member in said net load chamber and supported by said net load diaphargm for controlling flow through said passage, means for introducing air at a constant flow into said net load chamber, said body having a vent chamber between one of said dampening chambers and said net load diaphragm, said vent chamber being partially defined by said net load diaphragm and being vented to atmosphere, and rigid means cooperating with said guide member and extending between said anvil and net load diaphragm, whereby force supplied to said anvil is transmitted by said rigid means to said net load diaphragm and balanced by the pressure in said net load chamber which is controlled by the relative position of said valve member with respect to said passage.

2. A transmitter in accordance with claim 1 wherein said rigid means includes a rod, one end of said rod being coupled to said anvil, the other end of said rod extending through the net load diaphragm and being connected to a cage for said valve member, said cage being supported adjacent the lower surface of said net load diaphragm, and said guide member having a bore through which said rod extends.

3. A transmitter in accordance with claim 1 wherein each annular dampening diaphragm has a cylindrical portion defining its inner periphery, each dampening diaphragm and its cylindrical portion being integral and made from nylon reinforced Hycar.

4. A transmitter in accordance with claim 1 wherein said dampening diaphragms are thin flexible diaphragms having a durometer hardness below 35 and a rupture strength above 60 p.s.i.

5. A transmitter in accordance with claim 1 wherein said means defining an outlet passage includes a conduit having one end in said net load chamber, said valve member being biased towards said one end of the conduit for controlling flow from the net load chamber into the conduit, said valve member having an annular area exposed to the pressure in the net load chamber, pressure applied to said annular area by fluid in the net load chamber opposing the force applied to the anvil until an equilibrium position is attained at which point the pressure in the net load chamber balances the force applied to the anvil.

6. A transmitter in accordance with claim 1 wherein said diaphragm has a durometer hardness of 30, a rupture strength greater than 80 p.s.i., and a thickness of approximately .025 inch.

7. A transmitter in accordance with claim 1 wherein said dampening chambers are in series between said net load chamber and said tare weight chamber, an oil base dampening medium in each of said dampening chambers, a diaphragm separating said dampening chambers, and each of said dampening chambers being partially defined by one of said annular dampening diaphragms.

8. A transmitter in accordance with claim 7 including plate members connected to opposite sides of a central portion of the separating diaphragm, and means defining a bleed passage in the plate members and the separating diaphragm.

References Cited

UNITED STATES PATENTS

| | | | |
|---|---|---|---|
| 2,756,983 | 7/1956 | Furcini | 177—141 X |
| 3,177,958 | 4/1965 | Link | 177—208 |
| 3,261,417 | 7/1966 | Golding | 177—254 |

RICHARD B. WILKINSON, *Primary Examiner.*

G. H. MILLER, Jr., *Assistant Examiner.*